United States Patent [19]

Fitzgerald et al.

[11] Patent Number: 4,708,918
[45] Date of Patent: Nov. 24, 1987

[54] BATTERY ELEMENT AND BATTERY INCORPORATING POLAR POLYMER SYSTEM

[75] Inventors: Maurice E. Fitzgerald, Havertown; David M. Braunstein, Berwyn, both of Pa.; Saulius A. Alkaitis, Venice; Naum Pinsky, Thousand Oaks, both of Calif.

[73] Assignee: Ensci, Inc., Chatsworth, Calif.

[21] Appl. No.: 843,053

[22] Filed: Mar. 24, 1986

[51] Int. Cl.$^4$ .................... H01M 4/14; H01M 10/18
[52] U.S. Cl. .................... 429/210; 429/212; 429/217; 429/228
[58] Field of Search ............ 429/210, 225–228, 429/212, 217, 253, 254, 234, 232; 428/432; 156/326

[56] References Cited

U.S. PATENT DOCUMENTS

| | | |
|---|---|---|
| 2,564,707 | 8/1951 | Mochel ............................ 428/432 |
| 4,154,638 | 5/1979 | Franz et al. ...................... 156/326 |
| 4,275,130 | 6/1981 | Rippel et al. ..................... 429/144 |
| 4,405,697 | 9/1983 | Rowlette .......................... 429/161 |
| 4,451,542 | 5/1984 | Ishida et al. ................... 429/172 X |
| 4,510,219 | 4/1985 | Rowlette .......................... 429/212 |
| 4,539,268 | 9/1985 | Rowlette ........................... 429/54 |
| 4,542,082 | 9/1985 | Rowlette .......................... 429/210 |
| 4,547,443 | 10/1985 | Rowlette et al. .................. 429/217 |

Primary Examiner—Anthony Skapars
Attorney, Agent, or Firm—Frank J. Uxa

[57] ABSTRACT

A battery element useful as at least a portion of the positive plates in a lead-acid battery comprises: an acid resistant substrate at least partially coated with an electrically conductive coating; and a fluid impervious matrix layer having mutually opposing first and second surfaces situated such that at least a portion of the coated substrate is embedded in the matrix layer which comprises polymer having increased polarity relative to polypropylene. This battery element may also be used in the bipolar plates of a lead-acid battery.

54 Claims, 2 Drawing Figures

BATTERY ELEMENT AND BATTERY INCORPORATING POLAR POLYMER SYSTEM

TECHNICAL FIELD

The present invention relates to battery elements useful in lead-acid batteries. More particularly, the invention relates to battery elements for use in lead-acid batteries, which elements include a substrate having a conductive coating at least partially embedded in certain polymer systems.

BACKGROUND ART

Even though there has been considerable study of alternative electrochemical systems, the lead-acid battery is still the battery of choice for general purposes, such as starting a vehicle, boat or airplane engine, emergency lighting, electric vehicle motive power, energy buffer storage for solar-electric energy, and field hardware, both industrial and military. These batteries may be periodically charged from a generator.

The conventional lead-acid battery is a multi-cell structure. Each cell comprises a set of vertical positive and negative plates formed of lead-acid alloy grids containing layers of electrochemically active pastes. The paste on the positive plate when charged comprises lead dioxide, which is the positive acting material, and the negative plate contains a negative active material such as sponge lead. An acid electrolyte, based on sulfuric acid, is interposed between the positive and negative plates.

Lead-acid batteries are inherently heavy due to use of the heavy metal lead in constructing the plates. Modern attempts to produce light-weight lead-acid batteries, especially in the aircraft, electric car and vehicle fields, have placed their emphasis on producing thinner plates from lighter weight materials used in place of and in combination with lead. The thinner plates allow the use of more plates for a given volume, thus increasing the power density.

Higher voltages are provided in a bipolar battery including bipolar plates capable of through-plate conduction to serially connected electrodes or cells. The bipolar plates must be impervious to electrolyte and be electrically conductive to provide a serial connection between electrodes.

U.S. Pat. Nos. 4,275,130; 4,353,969; 4,405,697; 4,539,268; 4,507,372; 4,542,082; 4,510,219; and 4,547,443 relate to various aspects of lead-acid batteries. Certain of these patents discuss various aspects of bipolar plates.

Attempts have been made to improve the conductivity and strength of bipolar plates. Such attempts include the use of conductive carbon particles of filaments such as carbon, graphite or metal in a resin binder. However, carbonaceous materials are oxidized in the agressive electrochemical environment of the positive plates in the lead-acid cell to acetic acid, which in turn reacts with the lead ion to form lead acetate, which is soluble in sulfuric acid. Thus, the active material is gradually depleted from the paste and ties up the lead as a salt which does not contribute to the production or storage of electricity.

The metals fare no better; most metals are not capable of withstanding the high potential and strong acid environment present at the positive plates of a lead-acid battery. While some metals, such as platinum, are electrochemically stable, their prohibitive cost prevents their use in high volume commercial applications of the lead-acid battery.

SUMMARY OF THE INVENTION

One object of the present invention is to provide an improved battery element useful in a lead-acid battery.

Another object of the present invention is to provide an improved lead-acid battery.

A further object of the present invention is to provide an improved bipolar plate lead-acid battery.

An additional object of the present invention is to provide a battery element useful in a lead-acid battery, which element includes a substrate coated with conductive material and one or more of certain polymer systems. These and other objects and advantages of the present invention will become apparent hereinafter.

An improved battery element useful in a lead-acid battery has been discovered. In one broad embodiment, the battery element is useful as at least a portion of the positive plates of the battery and comprises an acid resistant substrate at least partially coated with an electrically conductive coating; and a fluid impervious polymeric matrix layer having mutually opposing first and second surfaces situated such that at least a portion of the coated substrate is embedded in the matrix layer to form a fluid impervious conductive composite, provided that the polymeric matrix layer comprises polymer having increased polarity relative to polypropylene. In another embodiment, the battery element further comprises a positive active electrode material situated such that at least a portion of the coated substrate contacts the electrode material. In one embodiment, the positive active electrode material is in the form of a layer located adjacent to, and in electrical communication with, the first surface of the matrix layer of the above-noted composite. In a further embodiment, the battery element last described above further comprises a fluid-impervious conductive layer that is adjacent to, and in electrical communication with, the second surface of the matrix layer. In yet another embodiment, the element last described above further comprises a negative active electrode layer located adjacent to, and in electical communication with the fluid impervious conductive layer.

The combination of an acid resistant substrate coated with doped tin oxide at least partially embedded in a fluid impervious polar polymeric matrix material has substantial electrical, chemical, physical and mechanical properties making the composite useful as a lead-acid battery element. For example, the composite has substantial stability in the presence of, and is impervious to, sulfuric acid or the sulfuric acid-based electrolyte. The polar polymeric matrix layer in combination with the coated substrate has been found to provide outstanding physical, chemical, and electrochemical stability in the agressive, dynamic (repeated charge-discharge cycles) environment present in lead-acid batteries. Improved bonding between the embedded coated substrate and the matrix is provided with relatively polar polymeric matrix materials.

A suitable polymeric matrix material having the requisite polarity and stability at conditions present in a lead-acid battery may be used to embed at least a portion of the substrate. The matrix material should be at least initially fluid impervious to be useful in the present battery elements and batteries. Preferably the matrix material comprises one or more synthetic polymers. The polymeric material may be either a thermoplastic material or a thermoset material. Thermoplastic materials are those which can be softened with heat and while soft can be molded, cast, or extruded under pressure. Thermosetting materials are those which are changed chemically by the application of heat to become hard, dense, insoluble, and infusible substances. Among the polymers particularly useful in the present invention are polymers derived from a monomer component comprising a major amount by weight of at least one substantially hydrocarbonaceous compound, more preferably selected from the group consisting of olefins and diolefins (both aliphatic and aromatic) having 2 to about 12 carbon atoms per molecule and a minor amount by weight of at least one additional monomer effective to increase the polarity of the polymer. If the polymeric matrix material is to be a thermoplastic polymer, it is preferred that the matrix be substantially hydrocarbon-based and include one or more groups effective to increase the polarity of the polymer relative to polypropylene. Additive or additional monomers, such as maleic anhydride, vinyl acetate, acrylic acid, and the like and mixtures thereof, may be included prior to polymerization to give the substantially hydrocarbon-based polymer increased polarity. Hydroxyl groups may also be included in a limited amount, using conventional techniques, to increase the polarity of the final substantially hydrocarbon-based polymer.

By "substantially hydrocarbonaceous" and "substantially hydrocarbon-based" is meant those compounds and polymers, respectively, which comprise mainly carbon and hydrogen atoms. These compounds and polymers may include minor amounts of one or more non-hydrocarbon groups, e.g., to provide the presently desired increased polarity, provided that such non-hydrocarbon groups do not substantially interfere with the functioning of the present battery elements and batteries. Among the non-hydrocarbon groups which may be included are those groups which contain halogens, sulfur, nitrogen, oxygen, phosphorous and the like.

Among the preferred thermoplastic polymer matrix materials include co-polymers of additional monomers and olefins such as ethylene, propylene, butylenes, pentenes, hexanes, styrene and mixtures thereof. Other preferred thermoplastic polymers include polyvinyl- dene difluoride, combinations of polyphenylene oxide and polystyrene and mixtures thereof.

Because of weight and strength considerations, if the polymeric matrix material is to be a thermoplastic polymer, it is preferred that the matrix be a polypropylene-based polymer which includes one or more groups effective to increase the polarity. The preferred additional monomer is maleic anhydride, more preferably present in the polymer in an amount in the range of about 0.1% to about 10% by weight, more preferably about 1% to about 5% by weight.

Thermoset polymers, which have increased polarity relative to polypropylene and are stable at the conditions present in a lead-acid battery, are more preferred for use in the present polymeric matrix materials. The viscosity properties and flexibility of certain of these thermoset polymers provide for ease of manufacturing the coated acid resistnat substrate-matrix material composite of the present battery elements. For example, the coated substrate may be at least partially embedded in the thermoset polymer or polymer precursor prior to the final polymerization of the thermoset polymer. More effective bonding of the coated substrate with thermoset polymeric matrix materials is achieved. This bonding is important to provide increased protection for the coated substrate at the agressive conditions present in lead-acid batteries.

The thermoset polymers useful in the present invention are selected from the group consisting of epoxies, phenol-formaldehyde polymers, polyesters, polyvinyl esters, polyurethanes, melamine-formaldehyde polymers and ureaformaldehyde polymers. Each of these classes of polymers represents many individual polymers, the composition of which can be varied by selecting different monomers and/or adjusting the ratio or ratios of the monomers used to produce the thermoset polymer. These thermoset polymers may be produced using conventional techniques, well known in the art. Therefore, no further discussion of such techniques is presented here. More preferably, the thermoset polymers are selected from the group consisting of epoxies, phenol-formaldehyde polymers, polyesters and polyvinyl esters.

Various techniques, such as casting, molding and the like, may be used to at least partially embed the doped tin oxide coated substrate into the matrix material. The choice of technique may depend, for example, on the type of matrix material used, the type and form of the substrate used and the specific application involved. Certain of these techniques are presented in U.S. Pat. No. 4,547,443, the entire disclosure of which is hereby incorporated by reference herein. One particular embodiment involves pre-impregnating (or combining) that portion of the doped tin oxide coated substrate to be embedded in the matrix material with a relatively polar (increased polarity relative to polypropylene) thermoplastic polymer, such as polyvinylidene difluoride, prior to the coated substrate being embedded in the matrix material. This embodiment is particularly useful when the matrix material is itself a thermoplastic polymer, such as polypropylene, and has been found to provide improved bonding between the doped tin oxide coated substrate and the matrix material.

The substrate is acid resistant. That is, the substrate exhibits some resistance to corrosion, erosion, and/or other forms of deterioration at the conditions present, e.g., at or near the positive plates or positive side of the bipolar plates, in a lead-acid battery. Although the conductive coating and the polymeric matrix material do provide a degree of protection for the substrate against these conditions, the substrate should itself have an inherent degree of acid resistance. If the substrate is acid resistant, the physical integrity and electrical effectiveness of the conductive coating, and of the whole present battery element, is better maintained with time relative to a substrate having reduced acid resistance. If glass is used as the substrate, it is preferred that the glass have an increased acid reistance relative to E-glass. Preferably, the acid resistant glass substrate is at least as resistant as is C-glass to the conditions present in a lead-acid battery.

Typical compositions of E-glass and C-glass are as follows:

|  | Weight Percent | |
| --- | --- | --- |
|  | E-glass | C-glass |
| Silica | 54 | 65 |
| Alumina | 14 | 4 |
| Calcia | 18 | 14 |
| Magnesia | 5 | 3 |

-continued

|  | Weight Percent | |
| --- | --- | --- |
|  | E-glass | C-glass |
| Soda + Potassium Oxide | 0.5 | 9 |
| Boria | 8 | 5 |
| Titania + Iron Oxide | 0.5 | — |

Preferably the glass contains more than about 60% by weight of silica and less than about 35% by weight of alumina, and alkali and alkaline earth metal oxides.

The acid resistant substrate is preferably in the form of particles or fibers. The substrate may be organic or inorganic. For example, the substrate may comprise an organic-based polymer material, a ceramic, a glass or like material. Because of availability, cost and performance considerations, it is preferred that the substrate be in the form of fibers. The presently useful fibers preferably are in a form selected from the group consisting of fiber rovings, chopped fibers, single fibers, woven fibers and the like. In order to provide improved point-to-point contacting in the fibrous substrate, which is highly desirable for improved conductivity and electrical effectiveness of the lead-acid battery, the substrate more preferably is in the form of a body of woven fibers, still more preferably, having a porosity in the range of about 60% to about 95%. Porosity is defined as the percent or fraction of void space within a body of woven fibers. The above-noted porosities are calculated based on the woven fibers including the conductive coating.

The substrate, because of availability, cost and performance considerations, preferably comprises acid resistant glass, more preferably in the form of fibers, as noted above.

The coating on the substrate is to be electrically conductive. Among the coatings which may be used are metal oxides, preferably metal oxides which are doped with one or more ions to provide for increased electrical conductivity. One particularly preferred metal oxide coating is tin oxide (stannic oxide) which is itself stable at the conditions present in a lead-acid battery.

Any suitable dopant may be used to dope the metal oxide, preferably tin oxide coating. Such dopant or combination of dopants should be such as to be effective to improve the electric conductivity (reduce the resistivity) of the coating on the substrate. The preferred dopant for the coating is selected from the group consisting of fluoride ion, antimony ion and mixtures thereof. Fluoride ion is particularly perferred since it is especially tolerant of the agressive environment in a lead-acid battery. The amount of dopant present in the coating may vary widely, provided that the amount present is effective to improve the electrical conductivity of the coating, e.g., relative to the conductivity of the coating with no dopant present. If fluoride ion is to be used as a dopant, it is preferred that the fluoride ion be present in the coating, e.g., tin oxide coating, in an amount in the range of about 0.01 mole % to about 20 mole %, based on the entire doped tin oxide coating preferably from about 1 mole % to about 10 mole %.

The coating on the acid resistant substrate is typically such that satisfactory electrical conductivity is achieved. As noted previously, this coating may also act to physically protect the substrate from the battery environment. The thickness of the coating may vary widely and depends, for example, on the electric conductivity desired, on the coating material being used, and on the type and amount of acid resistant substrate. The thickness of the coating may be as little as a molecular mono-layer. Preferably, the coating has an average thickness in the range of about 0.01 micron to about 10 microns, particularly when the substrate is in the form of glass fibers having an average diameter in the range of about 1 micron to about 20 microns and the average length to diameter ratio of the glass fibers is in the range of about 100,000 to about 2,000,000.

Any suitable process may be employed to apply the coating, e.g., doped tin oxide coating, onto the substrate. The primary criterion for such processing is that an effective coating results. Where, as is preferred, the acid resistant substrate is in the form of particles or fibers, the preferred doped tin oxide coating is preferably applied using spray pyrolysis or a new chemical vapor deposition process discussed in commonly assigned U.S. patent application Ser. No. 843,047 filed Mar. 24, 1986, the entire disclosure of which is hereby expressly incorporated by reference herein.

The bonding between the polar matrix material and the coated, acid resistant substrate is important to provide effective battery operation. In order to provide for improved bonding of the coating e.g., a doped tin oxide coating, (on the substrate with the matrix material), it is preferred to at least partially, more preferably substantially totally, coat the coated substrate with a coupling agent which acts to improve the bonding of the electrically conductive coating with the matrix. This is particularly useful when the substrate comprises acid resistant glass fibers and the electrically conductive coating is doped tin oxide. Any suitable coupling agent may be employed. Such agents preferably comprise a polar portion and a non-polar portion. Certain materials generally in use as sizings for glass fibers may be used here as a "size" for the coated glass fibers. The amount of coupling agent used to coat the coated glass fibers should be effective to provide the improved bonding noted above and, preferably, is substantially the same as is used to size bare glass fibers. Preferably, the coupling agent is selected from the group consisting of silanes, silane derivatives, titanates, titanate derivatives and mixtures thereof. U.S. Pat. No. 4,154,638 discloses silane-based coupling agents adapted for use with tin oxide surfaces. The entire disclosure of this patent is hereby expressly incorporated by reference herein.

The positive active electrode material is situated so that at least a portion of the electrically conductive doped tin oxide coated substrate contacts the electrode material. Any suitable positive active electrode material or combination of materials useful in lead-acid batteries may be employed in the present invention. One particularly useful positive active electrode material comprises electrochemically active lead oxide, e.g., lead dioxide, material. A paste of this material is often used. If a paste is used in the present invention, it is applied so that there is appropriate contacting between the coated substrate and paste.

In the embodiment in which the present battery element is at least a portion of a bipolar plate in a lead-acid battery, it is preferred that the element further comprises a fluid-impervious conductive layer that is resistant to reduction adjacent to, and preferably in electrical communication with, the second surface of the polar polymeric matrix material. The conductive layer is preferably selected from metal, more preferably lead, and substantially non-conductive polymers, more preferably synthetic polymers, containing conductive material. The non-conductive polymers may be chosen from the polymers discussed previously as matrix materials. One particular embodiment involves using the same polymer in the matrix material and in the non-conductive polymer at a thickness from about 1 to about 20 mils. The electrically conductive material contained in the non-conductive layer preferably is selected from the group consisting of graphite, lead and mixtures thereof.

In the bipolar plate configuration, the present battery element further comprises a negative active electrode layer located to, and preferably in electric communication with, the fluid impervious conductive layer. Any suitable negative active electrode material useful in lead-acid batteries may be employed in the present invention. One particularly useful negative active electrode material comprises lead, e.g., sponge lead. Lead paste is often used.

Certain of these and other aspects of the present invention are set forth in the following description, particularly when considered in conjunction with the accompanying drawings in which like parts bear like reference numerals.

DETAILED DESCRIPTION OF PREFERRED EMBODIMENT

Figure 1:
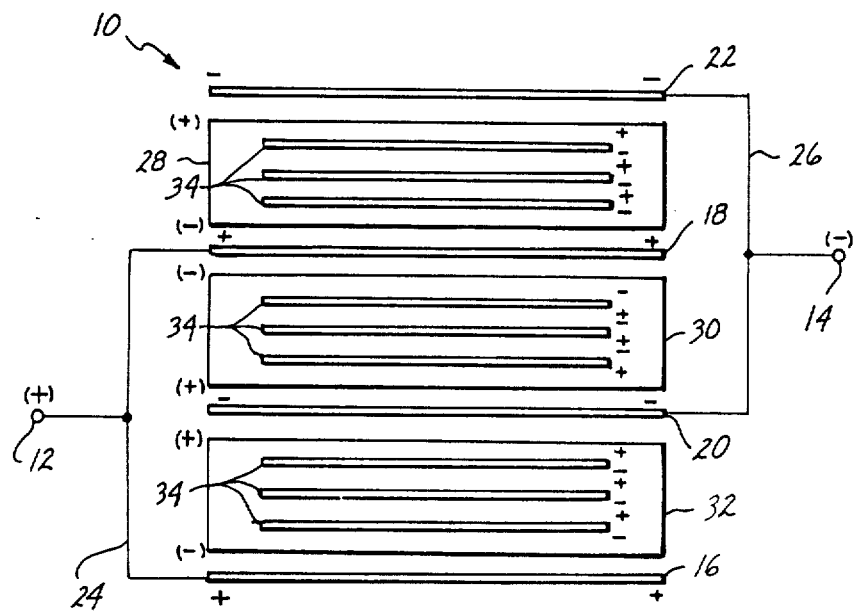
FIG. 1 is a schematic diagram of the series-parallel electrical connection of bipolar and monopolar plates.

Referring now to FIG. 1 a schematic representation of a bipolar battery 10 is shown, comprising a positive terminal 12 and a negative terminal 14. Battery 10 includes a monopolar grid or plate stack having two positive monopolar plates 16 and 18 and two negative monopolar plates 20 and 22.

Monopolar plates 16, 18, 20, 22 are stacked vertically with suitable electrolyte layers (not shown) provided. Positive monopolar plates 16 and 18 are connected in parallel by a bus bar, shown schematically at 24, to positive terminal 12 to provide an electric potential of about eight volts. The amount of current is determined by the size of positive monopolar plates 16 and 18. Negative monopolar plates 20 and 22 are connected by a bus bar, shown schematically at 26, to negative terminal 14 to also provide a voltage potential of about eight volts and a current varying depending upon the size of negative monopolar plates 20 and 22.

As is known in bipolar battery technology, bipolar plate groupings 28, 30, 32 are inserted between the monopolar plates 16, 18, 20, 22. Bipolar plate groupings 28, 30, 32 are positioned so that their uppermost and lowermost positive sides are adjacent to one of negative monopolar plates 20 and 22 and their uppermost and lowermost negative sides are adjacent to one of positive monopolar plates 16 and 18. Bipolar plate groupings 28, 30, 32 include a series of vertically stacked bipolar plates 34. Bipolar plates 34 are stacked vertically with suitable electrolyte layers (not shown) provided between bipolar plates 34 to provide a bipolar plate grouping having variable voltage depending upon the number of bipolar plates 34 present in a given grouping. It will be appreciated that the bipolar plate grouping is not connected to bus bars 24 and 26, but rather is secured within the battery stack by suitable non-conductive means (not shown).

Figure 2:
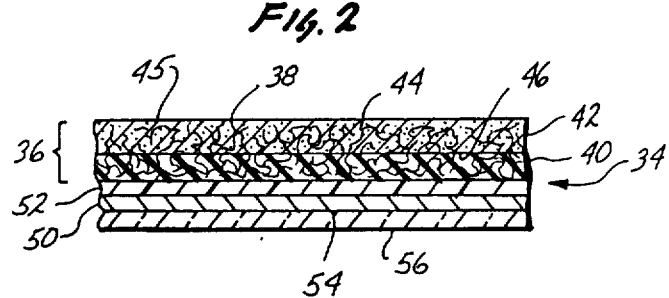
FIG. 2 is a cross section of a bipolar plate for a lead-acid battery incorporating doped tin oxide coated acid resistant substrate.

Referring now to FIG. 2, a unitary, bipolar battery plate 34 is illustrated. Plate 34 comprises a body 36 of woven fiberglass with the glass being C-glass (with a composition substantially as indicated previously), the strands 38 of which contain a coating of electrically conductive fluoride ion doped tin oxide. Body 36 has a porosity of about 75%. The average diameter of the individual fibers or strands 38 in body 36 is about 5 microns. The average thickness of the doped tin oxide coating is about 1 micron and about 2 mole % of the coating is fluoride ion.

The lower portion of fiberglass body 36 is embedded in a layer 40 of synthetic, epoxy-type thermoset polymer forming a fluid-impervious, through-conductive substrate.

The lower portion of body 36 may be embedded in thermoset layer 40 using various techniques. It is preferred that the lower portion of body 36 be contacted with the material making up thermoset layer 40 before the thermoset polymer is fully cured. One of the advantages of using thermoset polymers, such as epoxies, for layer 40 is that the viscosity of the monomers or pre-polymers is sufficiently low to allow the doped tin oxide coated substrate, e.g., body 36, fiberglass to be contacted with the monomer or pre-polymers with no substantial undue breakage of the substrate, e.g., individual glass fiber strands within body 36. This low viscosity of the thermoset's monomers or pre-polymers provides for improved control over the manufacture of the doped tin oxide coated substrate-matrix material composite. Prior to being partially embedded in layer 40, body 36 (including the doped tin oxide coating) is coated with a silane derived coupling agent as described in U.S. Pat. No. 4,154,638 to improve the bonding of body 36 with layer 40.

The upper portion of body 36 contains lead dioxide forming a positive active electrode layer 42. The particles 44 of lead dioxide are in contact with strands 38 which form conduction paths from top surface 45 to bottom surface 46 of layer 42.

The thickness of the resin layer 40 is preferably in the range of about 1 to about 20 mils, more preferably about 4 to about 10 mils.

Positive active electrode layer 42 is prepared according to methods well established in the art. The lead dioxide particles 44 can be dispersed in water to form a paste and impregnated into the upper portion of body 36 and dried, or a precursor paste of lead sulfate and litharge (PbO) such as one containing 75% lead sulfate and 25% litharge in water can be worked into the pores of the upper portion of body 36 and dried and cured. The paste is converted to lead dioxide by applying a charging potential to the paste.

A layer 50, which is conductive and stable under reducing conditions, is adhered to plate 34 by a conductive adhesive such as a film 52 of graphite-filled epoxy adhesive. Layer 50 can be a thin film or foil of lead preferably having a thickness in the range of 0.5 to about 10 mils, more preferably about 1 to about 5 mils. The fabrication of the bipolar plate is completed by depositing a layer 54 of negative active material such as lead paste onto layer 50 supported by a sheet 56 of glass scrim.

Battery 10 is placed in service and performs well in both the charge and discharge modes. The doped tin oxide coating on body 36 provides adequate conductivity. Importantly, this performance continues after a period of time in charge/discharge cyclic operation. This performance stability is vital in many lead-acid battery applications. Thus, the doped tin oxide coated, acid resistant glass fibers of body 36 have substantial stability at the agressive, acidic/oxidative conditions present on the positive side of bipolar plates 34. In addition, the present system provides for outstanding bonding between the coated substrate and the matrix material. Weakness in this bonding has been one primary cause of failure in prior art bipolar plates. Improved bonding between the doped tin oxide coated substrate and the matrix material at conditions present in the lead-acid battery is one of the primary advantages of the present invention.

While the invention has been described with respect to various specific embodiments and examples, it is to be understood that the invention is not limited thereto and that it can be variously practiced within the scope of the following claims.

The embodiments of the invention in which an exclusive property or privilege is claimed are defined as follows:

1. A battery element useful as at least a portion of the positive plates in a lead-acid battery comprising: an acid resistant substrate at least partially coated with an electrically conductive coating; and a fluid impervious polymeric matrix layer having mutually opposing first and second surfaces situated such that at least a portion of said coated substrate is embedded in said matrix layer, provided that said polymeric matrix layer comprises polymer having increased polarity relative to polypropylene.

2. The element of claim 1 wherein said polymer is a thermoplastic polymer or a thermoset polymer.

3. The element of claim 1 wherein said polymer is derived from a monomer component comprising a major amount by weight of at least one substantially hydrocarbonaceous compound and a minor amount by weight of at least one additional monomer effective to increase the polarity of said polymer.

4. The element of claim 3 wherein said substantially hydrocabonaceous monomer is selected from the group consisting of olefins and diolefins having 2 to about 12 carbon atoms per molecule and mixtures thereof.

5. The element of claim 3 wherein said substantially hydrocarbonaceous monomer is propylene.

6. The element of claim 5 wherein said additional monomer is maleic anhydride.

7. The element of claim 1 wherein said polymer is a thermoset polymer.

8. The element of claim 7 wherein said thermoset polymer is selected from the group consisting of epoxies, phenol-formaldehyde polymers, polyesters, polyvinyl esters, polyurethanes, melamine-formaldehyde polymers and ureaformaldehyde polymers.

9. The element of claim 7 wherein said thermoset polymer is selected from the group consisting of epoxies, phenol-formaldehyde polymers, polyesters and polyvinyl esters.

10. The element of claim 1 which further comprises a positive active electrode layer located adjacent to said first surface of said matrix layer, provided that a portion of said coated substrate extends into said electrode layer.

11. The element of claim 3 which further comprises a positive active electrode layer located adjacent to said first surface of said matrix layer, provided that a portion of said coated substrate extends into said electrode layer.

12. The element of claim 7 which further comprises a positive active electrode layer located adjacent to said first surface of said matrix layer, provided that a portion of said coated substrate extends into said electrode layer.

13. The element of claim 10 wherein said positive active electrode layer contains electrochemically active lead oxide material.

14. The element of claim 11 wherein said positive active electrode layer contains electrochemically active lead oxide material.

15. The element of claim 12 wherein said positive active electrode layer contains electrochemically active lead oxide material.

16. The element of claim 10 which further comprises a fluid-impervious conductive layer that is resistant to reduction adjacent to said second surface of said matrix layer.

17. The element of claim 16 wherein said conductive layer is selected from metal and substantially non-conductive polymers containing conductive materials.

18. The element of claim 17 wherein said conductive layer is a non-conductive polymer containing particles of a material selected from the group consisting of graphite, lead and mixtures thereof.

19. The element of claim 16 wherein said polymer is derived from a monomer components comprising a major amount by weight of at least one substantially hydrocarbonaceous monomer and a minor amount by weight of at least one additional monomer effective to increase the polarity of said polymer.

20. The element of claim 16 wherein said polymer is a thermoset polymer.

21. The element of claim 14 which further comprises a negative active electrode layer located adjacent to said fluid-impervious conductive layer.

22. The element of claim 21 wherein said negative active electrode layer comprises a paste containing lead.

23. The element of claim 19 which further comprises a negative active electrode layer located adjacent to said fluid-impervious conductive layer.

24. The element of claim 20 which further comprises a negative active electrode layer located adjacent to said fluid-impervious conductive layer.

25. In a lead-acid battery having a plurality of positive plates and a plurality of negative plates, the improvement which comprises using battery elements in accordance with claim 1 as at least a part of said positive plates.

26. In a lead-acid battery having a plurality of positive plates and a plurality of negatie plates, the improvement which comprises using battery elements in accordance with claim 3 as at least a part of said positive plates.

27. In a lead-acid battery having a plurality of positive plates and a plurality of negative plates, the improvement which comprises using battery elements in accordance with claim 7 as at least a part of said positive plates.

28. In a lead-acid battery having a plurality of positive plates and a plurality of negative plates, the improvement which comprises using battery elements in accordance with claim 10 as said positive plates.

29. In a lead-acid battery having a plurality of positive plates and a plurality of negative plates, the improvement which comprises using battery elements in accordance with claim 11 as said positive plates.

30. In a lead-acid battery having a plurality of positive plates and a plurality of negative plates, the improvement which comprises using battery elements in accordance with claim 12 as said positive plates.

31. In a lead-acid battery having a plurality of bipolar plates, the improvement which comprises using battery elements in accordance with claim 21 as said bipolar plates.

32. In a lead-acid battery having a plurality of bipolar plates, the improvement which comprises using battery elements in accordance with claim 23 as said bipolar plates.

33. In a lead-acid battery having a plurality of bipolar plates, the improvement which comprises using battery elements in accordance with claim 24 as said bipolar plates.

34. The element of claim 1 wherein said acid resistant substrate is in the form of particles or fibers and is organic or inorganic.

35. The element of claim 34 wherein said acid resistant substrate is in the form of fibers.

36. The element of claim 35 wherein said fibers are in a form selected from the group consisting of fiber rovings, chopped fibers, single fibers, woven fibers and mixtures thereof.

37. The element of claim 36 wherein said fibers comprise acid resistant glass.

38. The element of claim 3 wherein said acid resistant substrate is in the form of glass fibers.

39. The element of claim 7 wherein said acid resistant substrate is in the form of glass fibers.

40. The element of claim 37 wherein said acid resistant glass has increased acid resistance relative to E-glass.

41. The element of claim 37 wherein said acid resistant glass is at least as resistant as C-glass to the conditions present in said lead acid battery.

42. The element of claim 35 wherein said fibers are in the form of a body of woven fibers having a porosity of about 60% to about 95%.

43. The element of claim 38 wherein said fibers are in the form of a body of woven fibers having a porosity of about 60% to about 95%.

44. The element of claim 39 wherein said fibers are in the form of a body of woven fibers having a porosity of about 60% to about 95%.

45. The element of claim 37 wherein said acid resistant glass fibers are at least partially coated with a coupling agent acting to improve the bonding of said conductive material coating with said matrix.

46. The element of claim 38 wherein said acid resistant glass fibers are at least partially coated with a coupling agent acting to improve the bonding of said conductive material coating with said matrix.

47. The element of claim 39 wherein said acid resistant glass fibers are at least partially coated with a coupling agent acting to improve the bonding of said conductive material coating with said matrix.

48. The element of claim 45 wherein said coupling agent is selected from the group consisting of silane, silane derivatives, titanates and mixtures thereof.

49. The element of claim 1 wherein said conductive coating comprises doped tin oxide.

50. The element of claim 3 wherein said conductive coating comprises doped tin oxide.

51. The element of claim 7 wherein said conductive coating comprises doped tin oxide.

52. The element of claim 49 wherein said tin oxide is doped with fluoride ion.

53. The element of claim 50 wherein said tin oxide is doped with fluoride ion.

54. The element of claim 51 wherein said tin oxide is doped with fluoride ion.

* * * * *

UNITED STATES PATENT OFFICE
CERTIFICATE OF CORRECTION

Patent No. 4,708,918    Dated November 24, 1987

Inventor(s) Fitzgerald, et al

It is certified that error appears in the above-identified patent and that said Letters Patent are hereby corrected as shown below:

Claim 19, line 2; change "components" to --component--.

Claim 21, line 1, change "14" to --16--.

Signed and Sealed this

Seventh Day of June, 1988

Attest:

DONALD J. QUIGG

*Attesting Officer*    *Commissioner of Patents and Trademarks*